United States Patent
Senba et al.

(10) Patent No.: US 6,897,827 B2
(45) Date of Patent: May 24, 2005

(54) INSTALLATION STRUCTURE FOR RFID TAG, METHOD FOR INSTALLING RFID TAG, AND COMMUNICATION USING SUCH RFID TAG

(75) Inventors: Fujio Senba, Tokyo (JP); Nakamaro Hyodo, Tokyo (JP); Jun Fujii, Tokyo (JP); Tomoki Uchiyama, Tokyo (JP); Shigeru Kida, Tokyo (JP)

(73) Assignee: Hanex Co., Ltd., Tokyo (JP)

( * ) Notice: Subject to any disclaimer, the term of this patent is extended or adjusted under 35 U.S.C. 154(b) by 0 days.

(21) Appl. No.: 10/311,637

(22) PCT Filed: Jul. 13, 2001

(86) PCT No.: PCT/JP01/06082
§ 371 (c)(1),
(2), (4) Date: Feb. 24, 2003

(87) PCT Pub. No.: WO02/07081
PCT Pub. Date: Jan. 24, 2002

(65) Prior Publication Data
US 2004/0052034 A1 Mar. 18, 2004

(30) Foreign Application Priority Data

Jul. 17, 2000 (JP) .................................. 2000-215935
Sep. 5, 2000 (JP) .................................. 2000-268241

(51) Int. Cl.[7] .............................. H01Q 1/40; H01Q 7/08; G08B 13/14

(52) U.S. Cl. .................... 343/873; 343/788; 340/572.7; 340/572.8

(58) Field of Search .................................. 343/741, 788, 343/866, 873; 340/572.1, 572.7, 572.8; 342/51

(56) References Cited

U.S. PATENT DOCUMENTS 6,204,764 B1 * 3/2001 Maloney .................. 340/568.1

FOREIGN PATENT DOCUMENTS

| JP | A-2000-114854 | 4/2000 |
| WO | WO 00/05675 | 2/2000 |

* cited by examiner

*Primary Examiner*—Michael C. Wimer
(74) *Attorney, Agent, or Firm*—Oliff & Berridge, PLC

(57) ABSTRACT

An RFID tag installing structure for installing a microminiaturized RFID tag having a cylindrical antenna coil to a conductive member, an RFID installing method, and communication method are disclosed. An RFID tag (1) having a cylindrical antenna coil (2) and shaped into a rod is characterized in that the axial direction of the RFID tag (1) is parallel to the installation surface composed of the bottom surface (7a) of an installation groove (7) made in a conductive member (5) and is in contact with the installation surface.

7 Claims, 16 Drawing Sheets

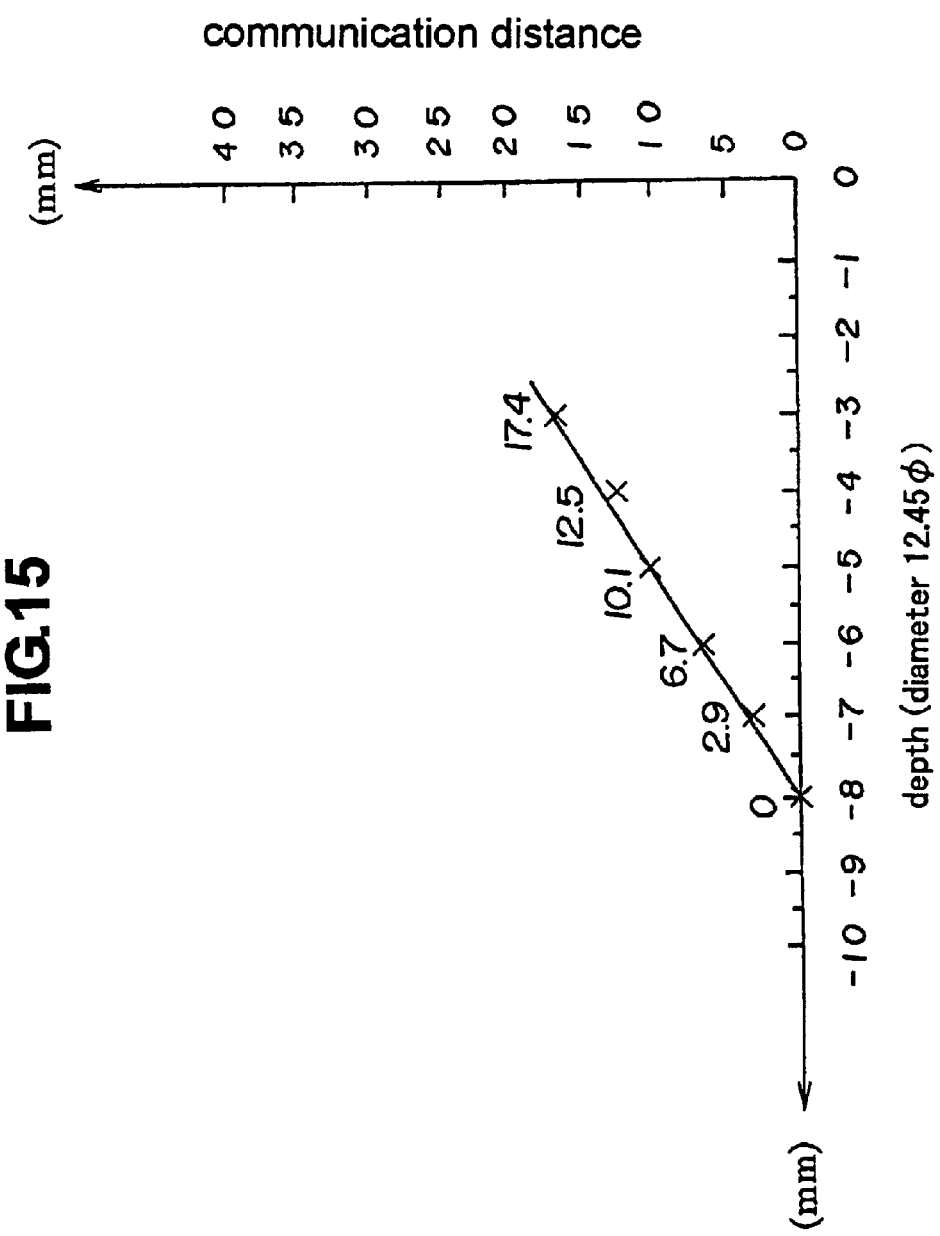

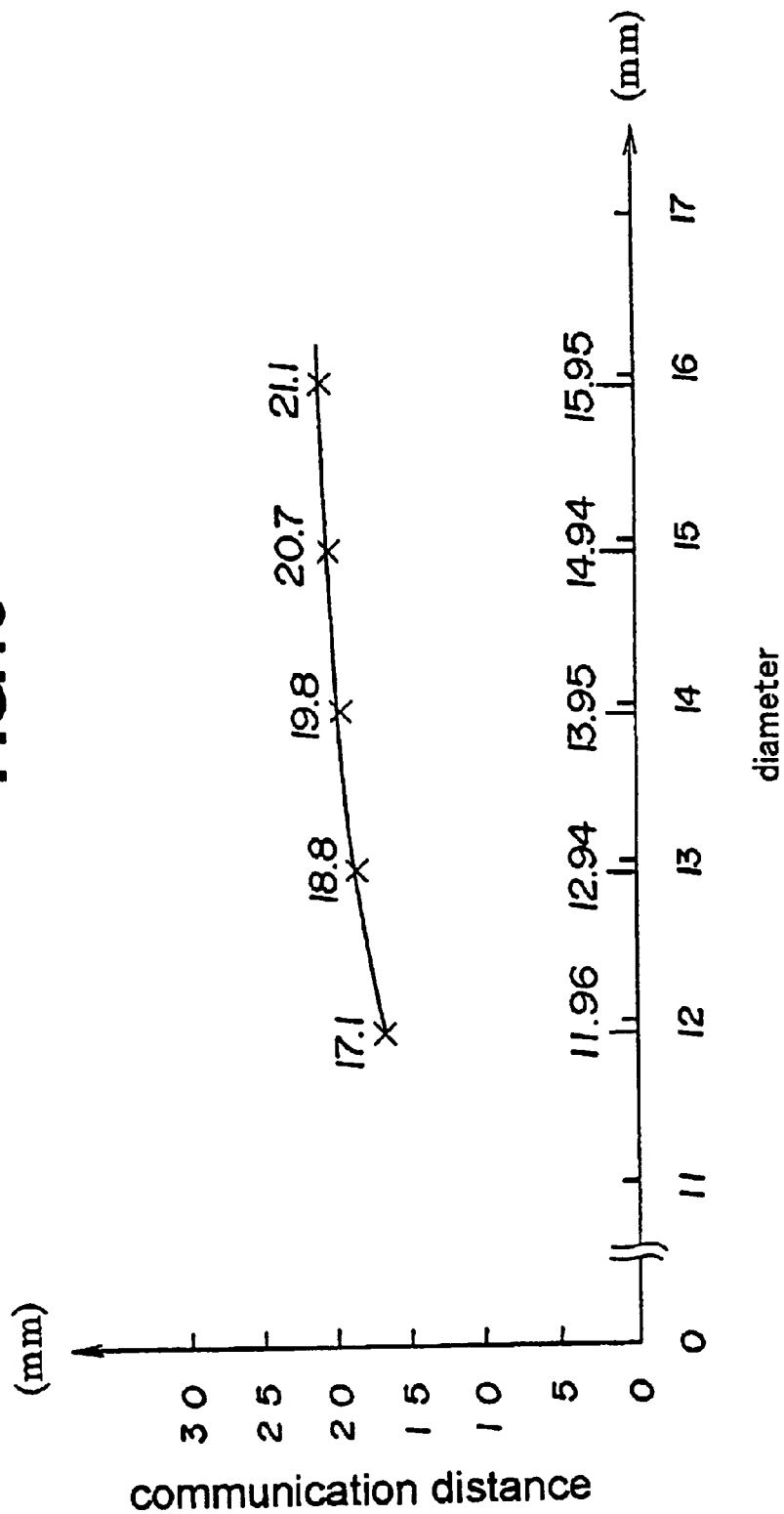

INSTALLATION STRUCTURE FOR RFID TAG, METHOD FOR INSTALLING RFID TAG, AND COMMUNICATION USING SUCH RFID TAG

CROSS-REFERENCE TO RELATED APPLICATION

The entire disclosure of Japanese patent application No. 2000-215935 filed on Jul. 17, 2000; and No. 2000-268241 filed on Sep. 5, 2000, including the specification, claims, accompanying drawings and abstract of the disclosure is incorporated herein by reference in its entirety, in order to claim priority right according to 35 U.S.C. §119.

1. Field of the Invention

The present invention relates to an installation structure and an installation method in which an RFID having an antenna coil and a control section is installed to a conductive member, and a communication method using such tag.

2. Description of the Related Art

Conventional RFID (Radio Frequency IDentification) tags are roughly classified into those of the electromagnetic induction type and the electromagnetic coupling type; both of which are designed to communicate in a non-contact manner with a read/write terminal or so using electromagnetic wave.

The RFID tag has an antenna coil and a control section, in which a signal sent from the read/write terminal is received by the antenna coil, converted by the control section into an electric power and stored in a capacitor, and using such electric power the antenna coil sends information such as an ID code stored in a memory section back to the read/write terminal.

There are two representative send/receive systems—ASK system and FSK system; where the send/receive operation of the former is based on amplitude shift keying, and the latter on frequency shift keying.

The antenna coils of the general RFID tags can be classified by types into those having a disk shape using a circular air-core coil, and those having cylindrical shape using a ferrite core rod and enameled wire wound around such core. The appearances of these tags depend on the shapes of the individual antenna coils, that is, the former appears as a disk, and the latter as a rod.

The RFID tag having a disk-shaped antenna coil performs communication based on changes in magnetic flux in the in-plane direction of a circular coil, and the RFID tag having a cylindrical antenna coil performs communication based on changes in magnetic flux in the axial direction of such tag.

Electromagnetic wave can now be referred as alternating electric field and magnetic field simultaneously propagating while being oscillating in planes normal to each other. When alternating magnetic flux ascribable to changes in the magnetic field is intersected by a conductive member such as those made of iron, aluminum or copper, such conductive member internally generates eddy current, and such eddy current generates counter magnetic flux in a direction canceling such alternating magnetic flux.

Hence, it has been a general practice to install the RFID tag apart as possible from the conductive member.

However for the case that the RFID tag has to be, by all means, installed in the vicinity of a conductive member, a possible measure is such that placing an RFID tag having the foregoing disk-shaped antenna coil so that the coil plane thereof is aligned in parallel to the surface of the conductive member, while being interposed with a non-conductive spacer so as to bring the tag apart from such conductive member to thereby suppress the generation of eddy current; or such that providing a material having a large magnetic permeability, such as a ferrite core or an amorphous magnetic material sheet, between the coil plane and the conductive member so as to direct magnetic flux possibly leaks through such conductive member toward the material having a large magnetic permeability to thereby suppress the generation of eddy current.

These methods are successful in reducing effects of the magnetic member, and any of these methods can perform communication in the direction normal to the coil plane, that is, the direction the magnetic flux from the disk-shaped antenna coil distributes.

On the other hand, an RFID tag having a cylindrical antenna coil is far more size-reducible than an RFID tag having a disk-shaped antenna coil, and is thus excellent in adoptability in various applications.

It has, however, been considered as principally difficult to install the RFID tag having a cylindrical antenna coil onto the surface of a conductive member, so that such installation has not been practiced.

As has been described in the above, the RFID tag having a cylindrical antenna coil generates magnetic flux along the axial direction of such antenna coil, so that it is advantageous in terms of sensitivity to perform communication with a read/write terminal from the tip of a core member inserted into such antenna coil.

According to such consideration, installation of such tag onto the surface of a conductive member must be such that aligning the axial direction thereof normal to the surface of the conductive member to facilitate the communication. This requires the conductive member to have in a surface portion thereof a vertical installation hole (installation groove), in which the RFID tag is installed vertically.

Communication between a read/write terminal and the RFID tag installed in such installation hole having a conformable size may, however, be disabled being adversely affected by the conductive member surrounding the tag. This is why the conventional technique has employed the RFID tag having a disk-formed antenna coil for the case it should be installed onto the surface of a conductive member.

SUMMARY OF THE INVENTION

The present invention is to solve the foregoing problems, and an object thereof resides in providing an installation structure and an installation method of RFID tag, which allows the RFID having a cylindrical antenna coil extensively reducible in size to be installed to a conductive member, and a communication method using such tag.

The present inventors found out after extensive investigations that communication with an RFID tag is enabled using magnetic flux extending in a space over the installation plane thereof if the RFID tag has a rod-shaped cylindrical antenna coil and is installed so as to direct the longitudinal direction (axial direction) thereof in parallel to the installation plane of a conductive member, and so as to approximately contact with such installation plane, which led them to complete the present invention.

That is, an installation structure for an RFID tag as set forth in embodiments is such that installing an RFID tag having an antenna coil and a control section to a conductive member, in which the RFID tag has a cylindrical antenna coil to thereby have as a whole a rod shape, and is installed so as to direct the axial direction thereof in parallel to the installation plane of said conductive member, and so as to approximately contact with such installation plane.

According to such constitution, a part of the magnetic flux goes out from the tip of the cylindrical antenna coil and extends along the axial direction thereof penetrates into the conductive member. While the total magnetic flux may slightly decrease depending on eddy current generated within such conductive member, a part of the residual magnetic flux penetrates the RFID tag and runs in a space over the installation plane of the conductive member to form closed loops. The communication with an external read/write terminal or the like is enabled while being mediated by such magnetic flux.

Even when the conductive member can afford only a very small space for installing the RFID tag, a highly size reducible RFID tag can readily be installed.

This also promises an excellent operability in the communication, since the communication is performed while being mediated by the magnetic flux penetrating the RFID tag and extending over the installation plane of the conductive member.

In such installation structure, the conductive member may have in the surface portion thereof a top-opened installation groove, in which the RFID tag can be installed so as to direct the axial direction thereof in parallel to the installation plane comprising the bottom plane of such groove. Such constitution allows the RFID tag to be installed stably to the conductive member, and also allows communication mediated by the magnetic flux which penetrates the RFID tag and extends in a space over the installation plane of the conductive member.

In either one of the foregoing installation structures, the RFID tag may be installed so as to keep a distance of 10 µm to 5 mm away from the installation plane of the conductive member. This successfully reduces affection by the conductive member to thereby sensitize the communication.

Limiting the distance between the RFID tag and the installation plane of the conductive member to 5 mm or below can successfully reduce the amount of projection of the RFID tag out from the surface of the conductive member, or reduce the depth of the installation groove formed in the conductive member. This ensures retainment of properties and strength of the conductive member.

An installation structure for an RFID tag as set forth in embodiments is such that installing an RFID tag having an antenna coil and a control section to a conductive member, in which the conductive member has in the surface portion thereof an installation groove, the RFID tag has a cylindrical antenna coil to thereby have as a whole a rod shape, and such tag is installed so as to direct the axial direction thereof oblique to the bottom plane of the installation groove.

According to such constitution, a projected installation area on the conductive member can further be shrunk as compared to that attainable in other embodiments The magnetic flux can propagate into a space formed aside the tag within the installation groove, and then leak out from the installation groove, which successfully mediates the communication with a read/write terminal.

In either one of the foregoing installation structures, the RFID tag in an installed state within the installation groove may be protected on the lateral plane and/or plane opposing to the installation plane thereof with a protective member made of a conductive material. This ensures more reliable protection of the RFID tag.

In the foregoing installation structure, the protective member can be provided with a top-opened housing portion in the surface portion thereof, and the RFID tag can be housed within such housing portion to thereby protect the lateral plane and/or plane opposing to the installation plane of such tag. This allows precise positioning and installation of the RFID tag with the aid of the protective member.

In either one of the foregoing installation structures, the surface side of the RFID tag installed to the conductive member may be covered with a protective member made of a non-conductive material. This effectively protects the RFID tag from external stress, impact or outer environment.

In either one of the foregoing installation structures, the RFID tag may be such as those performing communication based on the amplitude shift keying (ASK) system. Since the RFID tag based on the ASK system will not degrade the communication sensitivity when frequency shifting occurs affected by the conductive member, unlike the tag based on the FSK system, so that it can ensure a highly sensitive and stable communication even if installed so as to contact with the conductive member as in the present invention.

A method for installing an RFID tag as set forth in embodiments is such that for installing an RFID tag having an antenna coil and a control section to a conductive member, which comprises the steps of housing the RFID tag in a top-opened housing portion formed in the surface portion of a protective member made of a conductive material, wherein the RFID tag has a cylindrical antenna coil to thereby have as a whole a rod shape; and housing the protective member in a top-opened installation groove formed in the surface portion of the conductive member so as to direct the opened top of such housing portion to the opened top of such installation groove, and so as to direct the axial direction of such RFID tag in parallel to or oblique to the bottom plane of such installation groove.

According to the above constitution, the RFID tag is once housed within the protective member, and such protective member is then housed in the top-opened installation groove formed in the surface portion of the conductive member, so that even an extremely small RFID tag can readily be installed in the installation groove having a conformable small size.

This saves a time required for the installation, and enables installation of the RFID tag while being previously positioned in a precise manner.

A method for installing an RFID tag as set forth in embodiments is such that for installing an RFID tag having an antenna coil and a control section to a conductive member, which comprises the steps of installing the RFID tag, having a cylindrical antenna coil to thereby have as a whole a rod shape, so as to direct the axial direction of such tag in parallel to the installation plane of such conductive member, and so as to approximately contact with such installation plane; and performing communication using such RFID tag mediated by magnetic flux formed in a space above the installation plane of the conductive member.

According to such method, the communication can be effected in a state that the RFID tag is installed in contact with the conductive member, which is mediated by the magnetic flux penetrating the RFID tag and extending in a space over the installation plane of the conductive member.

A communication method using an RFID tag as set forth in embodiments is such that using an RFID tag having an antenna coil and a control section to a conductive member, which comprises the steps of forming an installation groove in the surface portion of the conductive member; installing the RFID tag, having a cylindrical antenna coil to thereby have as a whole a rod shape, so as to direct the axial direction of such tag in parallel to the bottom plane of such installation groove and so as to approximately contact therewith, or oblique to such bottom plane; and performing communication using by such RFID tag mediated by magnetic flux formed in a space above the installation plane of the conductive member.

According to such method, the communication is facilitated even when the conductive member is only affordable of a small-sized installation groove, since the RFID tag having a highly size-reducible cylindrical antenna coil can be installed in such small groove.

Installing the RFID tag on the surface of the conductive member facilitates the attachment of such tag, and installing the RFID tag within the installation groove ensures the safe retainment of such tag.

As has been described in the above, installing the rod-shaped RFID tag having a cylindrical antenna coil to the conductive member so as to direct the longitudinal direction (axial direction) in parallel to the installation plane and so as to approximately contact with such installation plane allows communication mediated by the magnetic flux penetrating such RFID tag and extending in a space over the installation plane.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 15 is a view showing a result of the communication distance having been measured by changing the depth of an installation groove with a round profile; and FIG. 16 is a view showing a result of the communication distance having been measured by changing the diameter of an installation groove with a round profile.

DETAILED DESCRIPTION OF THE PREFERRED EMBODIMENTS

Embodiments of the installation structure of the electromagnetic induction tag, methods for installing thereof, and communication method using such tag according to the present invention will specifically be explained referring to the attached drawings.

First, referring to FIGS. 1A, 1B to 6, installation structures of an electromagnetic induction tag, methods for installing thereof, and communication method using such tag according to a first embodiment of the present invention will be explained. It should now be noted that the RFID tags preferably applicable to the embodiments described below relate both to those of electromagnetic coupling type and electromagnetic induction type although the description below specifically deals with the latter type.

Figure 1:
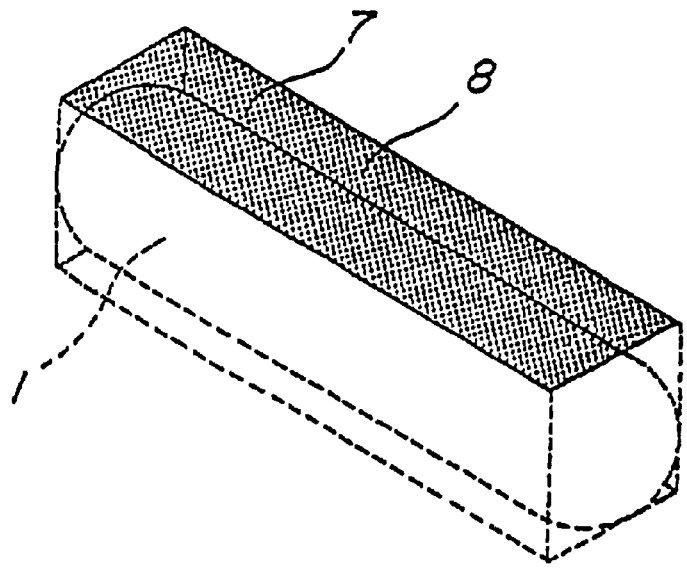
FIGS. 1A and 1B are a perspective view and a sectional view, respectively, explaining an exemplary installation structure of an RFID tag of the present invention, in which a top-opened installation groove having a square section is formed on the installation plane of a conductive member, an RFID tag covered with a protective member comprising a non-conductive glass container is installed in the installation groove, and the surface of the tag is further covered with a protective member comprising a non-conductive resin.
Figure 1:
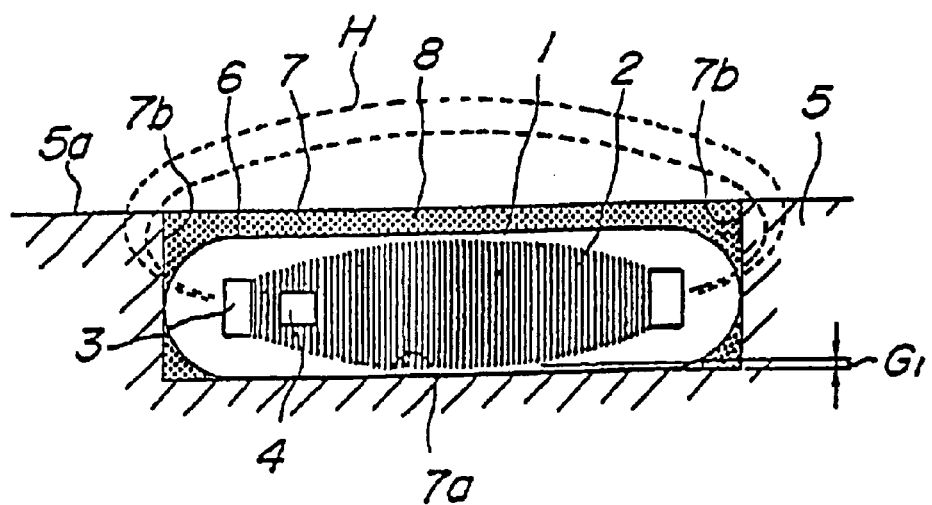
Figure 2:
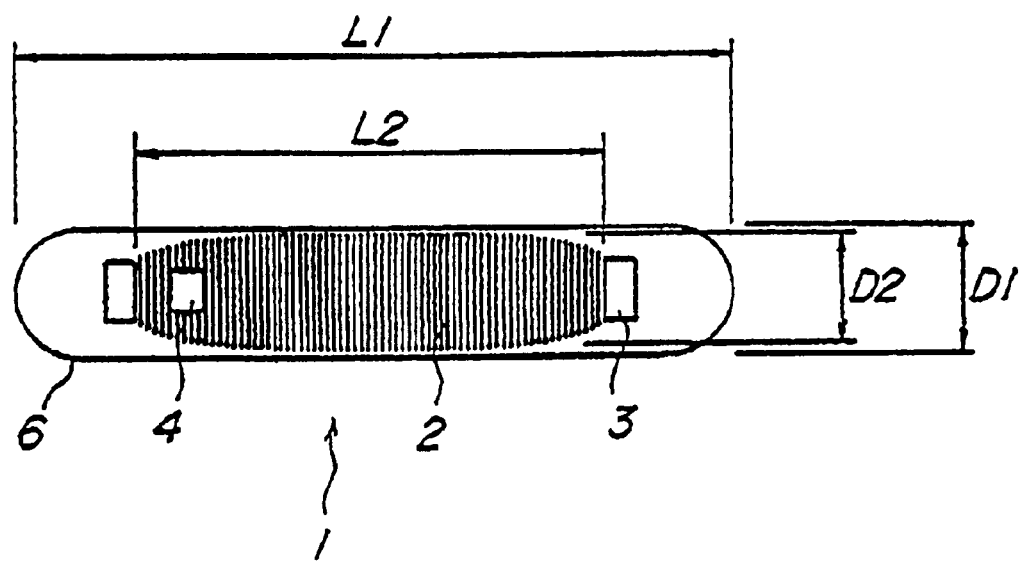
FIG. 2 is a front view showing a constitution of the RFID tag.

An RFID tag 1 shown in FIGS. 1A, 1B and 2 has a cylindrical antenna coil 2 and a semiconductor IC chip 4 as a control section, both of which being directly connected with each other without interfaced by a printed circuit board or the like, which successfully results in size reduction of the RFID tag 1.

The single-wire-wound, cylindrical antenna coil 2 has a cylindrical core member 3 made of iron, ferrite or so inserted therein along the axial direction thereof (the lateral direction in FIG. 1B), in which such antenna coil 2, core member 3, semiconductor IC chip 4 and so forth are formed in an integrated manner to provide a rod shape as a whole.

Figure 3:
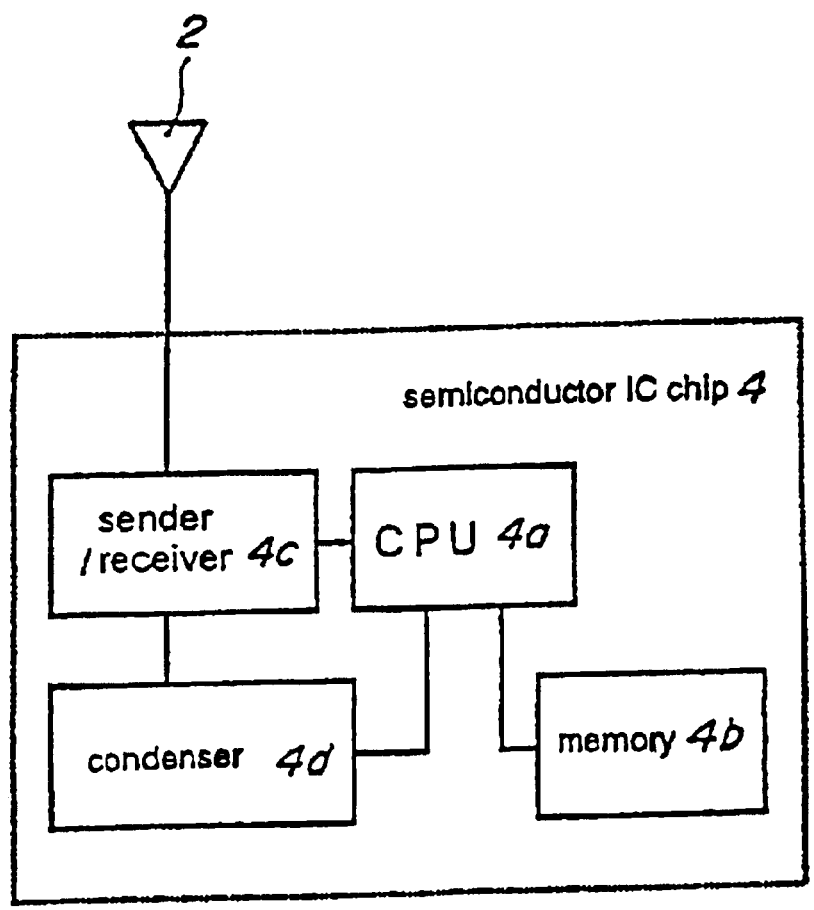
FIG. 3 is a block diagram showing a constitution of a control section of the RFID tag.

The semiconductor IC chip 4 comprises an IC (integrated circuit) chip or an LSI (large-scale integrated circuit) chip packaged in an integrated manner, and such semiconductor IC chip 4 has incorporated therein a CPU (central processing unit) $4a$ as a control section, a memory $4b$ as a memory section, a sender/receiver $4c$ and a capacitor $4d$ as a power storage means, as shown in FIG. 3.

Figure 5:
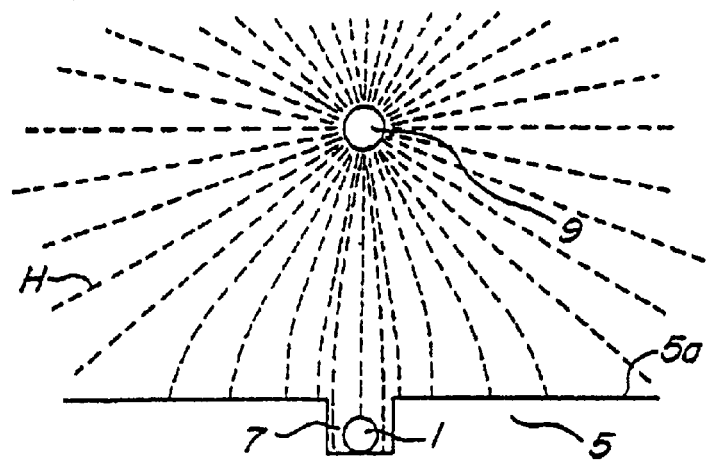
FIGS. 5A to 5C are schematic views showing a magnetic field generated from an antenna of an external read/write terminal and reaches a top-opened installation groove formed on the installation plane of the conductive member.
Figure 5:
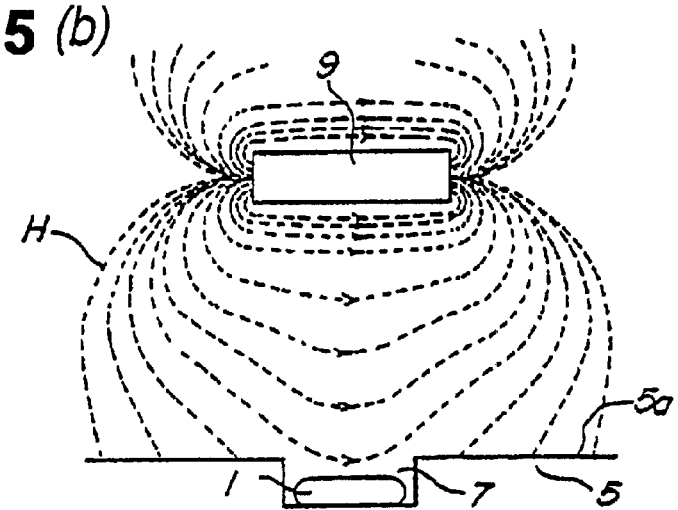
Figure 5:
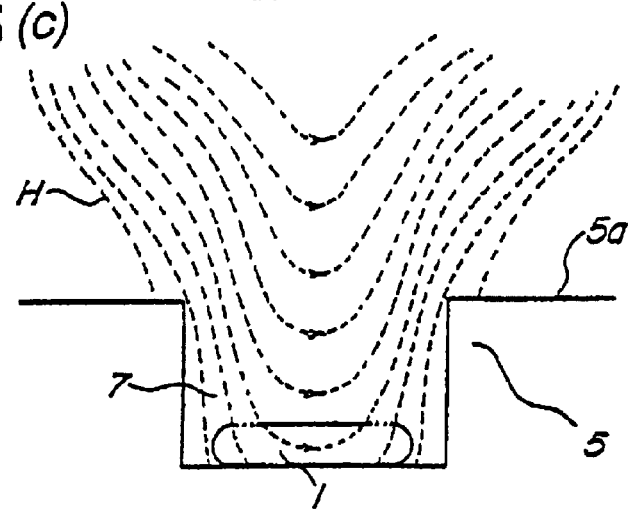
Figure 6:
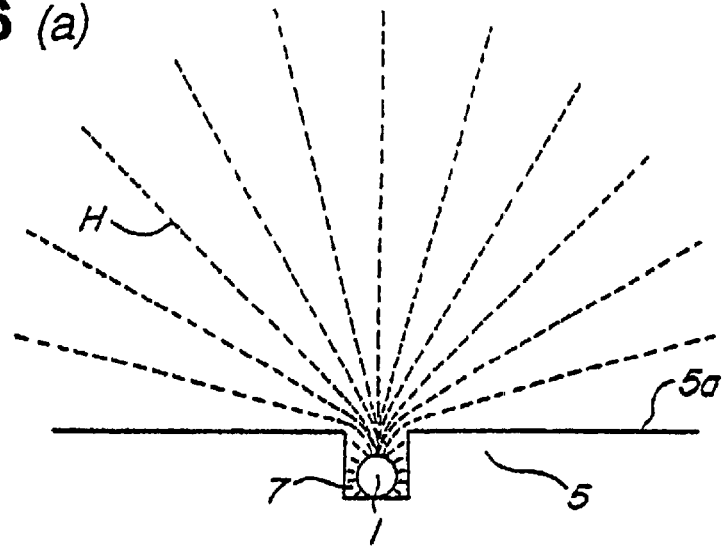
FIGS. 6A and 6B are schematic views showing a magnetic field generated from the RFID tag, installed in the top-opened installation groove formed on the installation plane of the conductive member, and propagates outward.
Figure 6:
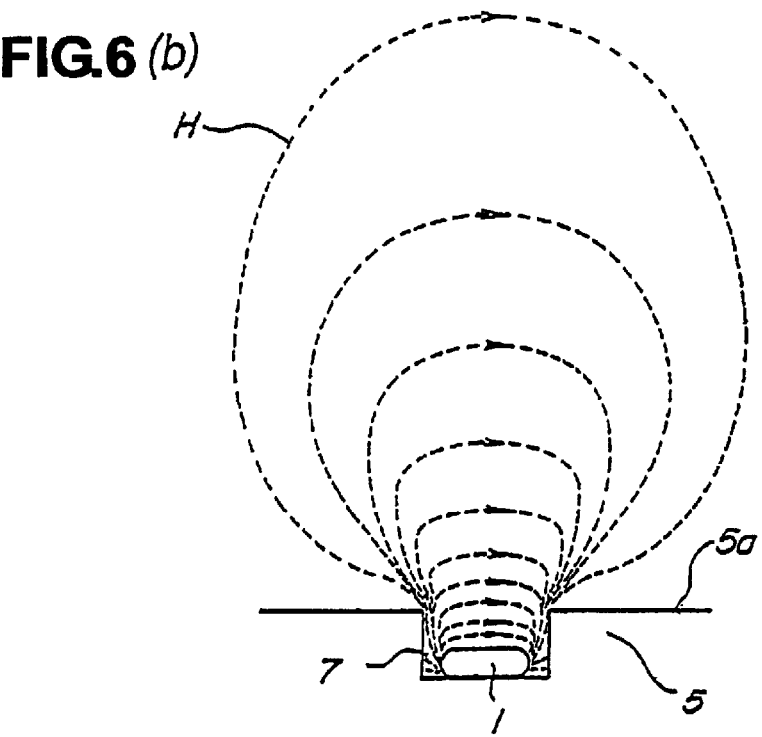

A signal sent from an antenna 9 of an external read/write terminal, shown in FIG. 5, is received by the sender/receiver $4c$, transmitted to the CPU $4a$ and converted into electric power to be stored in the capacitor $4d$. It is now also allowable to omit the capacitor $4d$ as a power storage means, and instead continuously supply electric power from the external read/write terminal to the semiconductor IC chip 4.

The CPU $4a$ is responsible for reading out programs or various data stored in the memory $4b$, performing necessary operations and decision, to thereby enable various controls.

The memory $4b$ contains various programs for allowing operation of the CPU $4a$, and various information such as history data and lot management data of products or parts having a conductive member 5 to which the RFID tag 1 is provided.

The RFID tag 1 employed in this embodiment is based on the single-wavelength amplitude shift keying (ASK), has a wide resonance frequency range, has an antenna coil 2 having a wire diameter as small as several tens micrometers with or without a core member 3, and has a CMOS-IC of extremely small electric power consumption having a specific send/receive circuit incorporated therein.

Experimental results obtained by the present inventors revealed that the communication using the RFID tag 1 based on the ASK system is hardly affected by the a conductive member placed in the vicinity thereof, since such RFID tag 1 has a wider resonance frequency range as compared with that of the tag based on the FSK system, and will not cause reduction in received electric power, and is thus less sensitive to frequency shifting.

From an aspect of sensitivity (communication distance), the frequency used for the ASK wireless communication system should preferably range from 50 kHz to 500 kHz, and more preferably, range from 100 kHz to 400 kHz. In this embodiment of the present invention, an ASK communication system of 125 kHz is used.

Experimental results obtained by the present inventors further revealed that the magnetic field H can propagate by diffraction even out from a narrow gap, and that the RFID tag 1 can send or receive the magnetic field, which is a medium for power supply or information communication, to or from an external read/write terminal only if a fine physical gap is provided.

There are some materials possibly generate eddy current responding to the magnetic field H generated during communication or electric power transmission using such RFID tag 1 to thereby generate a counter magnetic flux which attenuates the initial magnetic flux; examples of such conductive materials most typically include stainless steel sheet, copper sheet and aluminum sheet, and also include ferromagnetic metals such as iron, cobalt, nickel, alloys thereof and ferrite; paramagnetic metals such as aluminum, copper and chrome; and conductive plastics.

The lower the electric resistance of the conductive material is, the larger the eddy current generated from the change of magnetic field H is to become. Accordingly, from an aspect of sensitivity (communication distance), using an iron type alloyed conductive member, such as an iron with a relatively high electric resistance or a stainless steel, would be advantageous for this invention.

As shown in FIG. 2, the RFID tag 1 having an outer diameter $D_2$ in the radial direction is encapsulated in a glass container 6 as a non-conductive protective member having an outer diameter $D_1$ accommodative to $D_2$, which makes the whole periphery of the tag including the upper surface thereof is surrounded by the protective member.

The glass container 6 employed in this embodiment has a length $L_1$ in the axial direction of approx. 7 to 15.7 mm, and an outer diameter $D_1$ of approx. 2.12 to 4.12 mm. The installation groove 7 provided to the conductive member 5 is thus formed in a size enough for accommodating the RFID tag 1 having the length $L_1$ and the outer diameter $D_1$. The weight of the RFID tag 1 is approx. 55 to 400 mg.

Typical values for the length $L_1$ in the axial direction and the outer diameter $D_1$ of the RFID tag 1; and a length $L_2$ in the axial direction and the outer diameter $D_2$ of the antenna coil 2 are listed in Table 1 below.

TABLE 1

| | | Type 1 | Type 2 | Type 3 |
|---|---|---|---|---|
| Glass container 6 | Length $L_1$ in the axial direction | 12.00 mm | 13.18 mm | 15.90 mm |
| | Outer diameter $D_1$ | 2.12 mm | 3.10 mm | 4.06 mm |
| Antenna coil 2 | Length $L_2$ in the axial direction | 6.02 mm | 6.44 mm | 5.78 mm |
| | Outer diameter $D_2$ | 1.45 mm | 1.64 mm | 1.63 mm |

In a typical antenna coil 2, a single copper wire having a diameter of approx. 30 $\mu$m is wound in a stacked form in the radial direction and in a cylindrical form in the axial direction; where an inductance of such antenna coil 2 having the core member inserted therein was approx. 9.5 mH (at 125 kHz), and an electrostatic capacity of a capacitor connected for resonation to the antenna coil 2 was approx. 170 pF (at 125 kHz).

The conductive member 5 has on the surface $5a$ side thereof the top-opened installation groove 7 having a square section, in which the RFID tag 1 is directly placed on the bottom plane $7a$, which is the installation plane of the installation groove 7, so as to align the axial direction thereof (lateral direction in FIG. 1B) in parallel to such bottom plane $7a$ and so as to approximately contact therewith without interposed with a spacer or the like.

The residual space in the installation groove 7 around the glass container 6 encapsulating the RFID tag 1 is filled with a non-conductive protective member such as resin 8 or adhesive so as to cover the top surface of the glass container 6. It is also allowable that the RFID tag 1 is molded with a resin or covered with a plastic lid or cap, instead of being encapsulated in the glass container 6 and fixed with the resin 8.

The distance $G_1$ between the conductive outer surface of the antenna coil 2 opposing to the bottom plane $7a$, which is an installation plane in the installation groove 7 formed to the conductive member 5, and such bottom plane $7a$ is set at not smaller than 10 $\mu$m, which is equivalent to the thickness of an insulating film of the wound wire of the antenna coil 2, and at 5 mm or below.

While the antenna coil 2 may be projected out from the surface $5a$ of the conductive member 5, it is more preferable to make no projection out from the surface $5a$ in view of ensuring safe retainment of the RFID tag 1.

Figure 4:
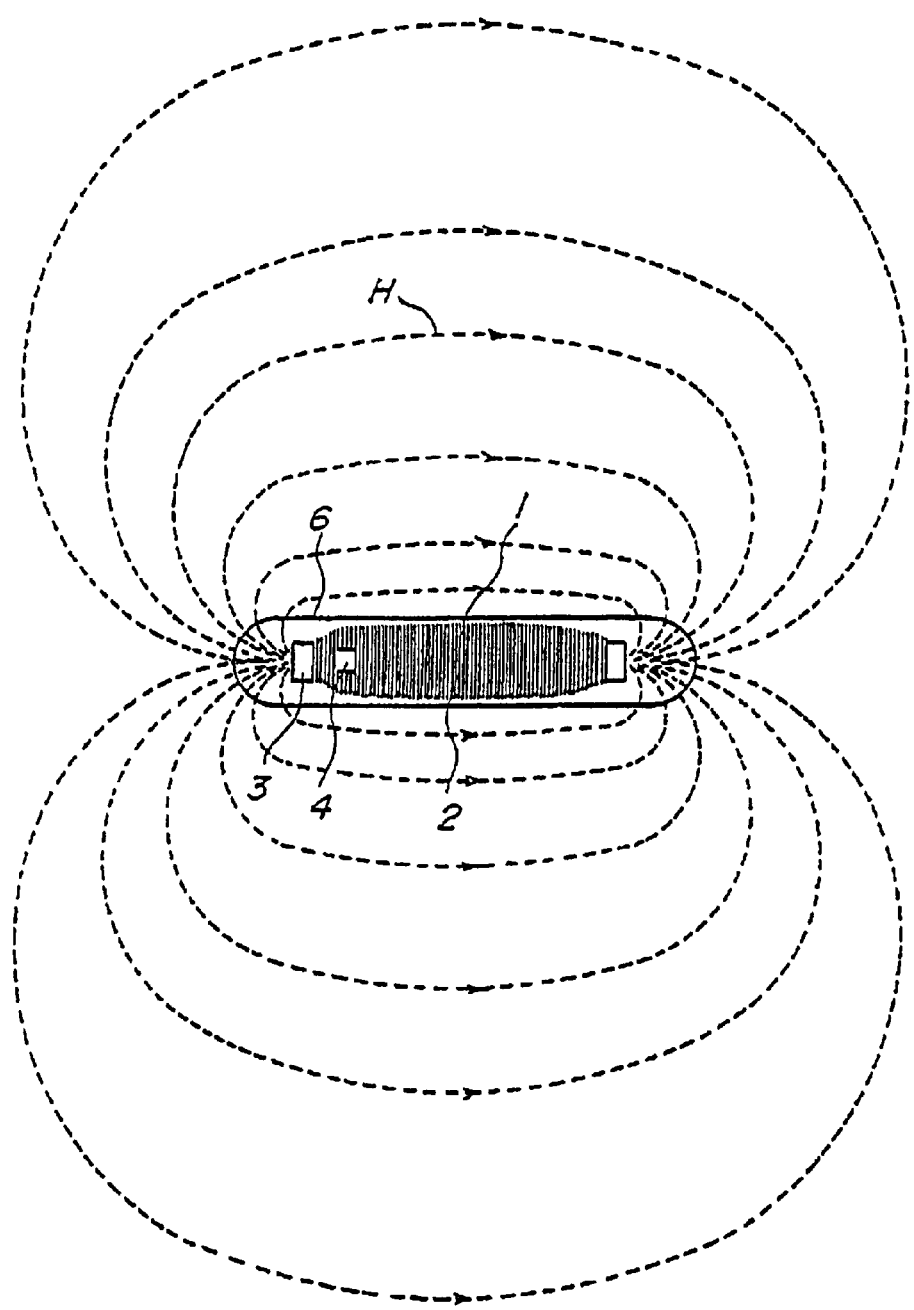
FIG. 4 is a schematic view showing a profile of a magnetic field generated around the RFID tag.

FIG. 4 shows a profile of a magnetic field H generated from the RFID tag 1 in a free state, and FIGS. 5A to 5C show profiles of a magnetic field H generated from an antenna 9 of an external read/write terminal and reaches the installation groove 7 provided to the conductive member 5.

The axial direction (direction of magnetic flux) of the antenna 9 and the axial direction (direction of magnetic flux) of the antenna coil 2 of the RFID tag 1 coincides with each other. FIG. 5A shows a view from the axial direction, FIG. 5B shows a view from a direction normal to the axial direction, and FIG. 5C shows an enlarged view in the vicinity of the installation groove 7 shown in FIG. 5B.

FIGS. 6A and 6B show a profile of the magnetic field H generated from the RFID tag 1 embedded in the installation groove 7 of the conductive member as shown in FIGS. 1A and 1B, where the former shows a view from the axial direction, and the latter shows a view from a direction normal to the axial direction.

As shown in FIG. 2, the end portion of the antenna coil 2 of the RFID tag 1 and the end portion in the axial direction of the glass container 6 are located in a positional relation defined by a dimensional difference between $L_1$ and $L_2$ listed in Table 1 above, and a resultant predetermined gap, shown in FIG. 1B, formed between the lateral plane 7b of the installation groove 7 and the end portion in the axial direction of the antenna coil 2 facilitates the formation of the magnetic flux loop penetrating such antenna coil 2, which contributes the formation of the magnetic field H.

The magnetic field H is formed by the leakage magnetic flux on the surface side of the conductive member 5 as shown in FIGS. 6A and 6B also when the RFID tag 1 is directly installed on the bottom plane 7a of the top-opened installation groove 7 so as to approximately contact therewith.

The magnetic field H can propagate by diffraction only when an opening of the installation groove 7 is given as a narrow gap provided that a proper length $L_2$ in the axial direction of the antenna coil 2 is ensured, and this allows the RFID tag 1 to send or receive AC magnetic field, which is a medium for power transmission and information communication, to or from an external read/write terminal not shown.

According to such constitution, a part of the magnetic flux, goes out from the end portion of the cylindrical antenna coil 2 and extends in the axial direction, penetrates into the conductive member 5, and is slightly attenuated in the total strength due to eddy current induced in such conductive member 5, but a part of the residual magnetic flux can form a loop routing through the RFID tag 1 and a space over the installation plane of the conductive member 5, which can mediate the communication with an external read/write terminal.

The RFID tag 1 having the highly size-reducible cylindrical antenna coil 2 is beneficial since such tag 1 can readily be installed when only an extremely limited space is available for the installation.

Another benefit resides in a good operability since the communication is mediated by the magnetic flux penetrating the RFID tag 1 and extending in a space over the installation plane of the conductive member 5.

Figure 7:
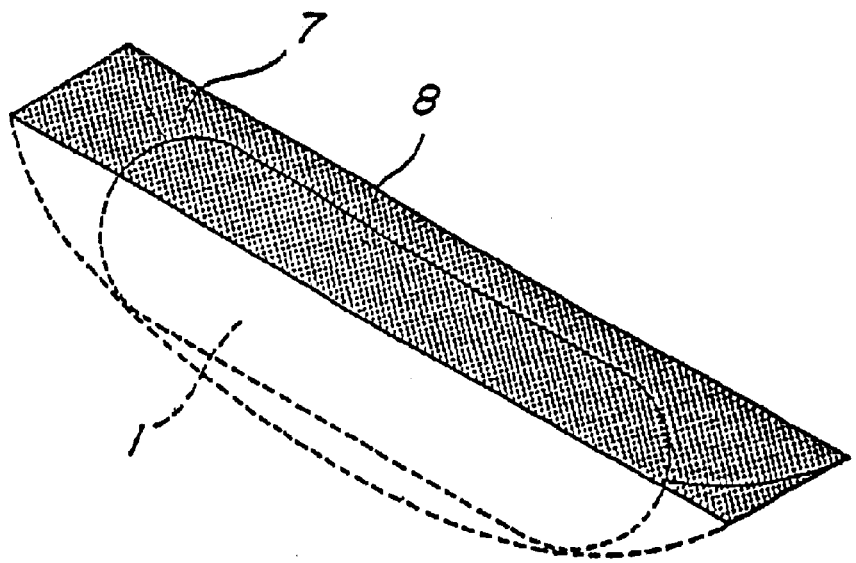
FIGS. 7A and 7B are a perspective view and a sectional view, respectively, showing another exemplary installation structure of an RFID tag of the present invention, in which a top-opened, arch-bottomed installation groove is formed on the installation plane of a conductive member, an RFID tag covered with a non-conductive protective member comprising a glass container is installed in the installation groove, and the surface of the tag is further covered with a protective member comprising a non-conductive resin.
Figure 7:
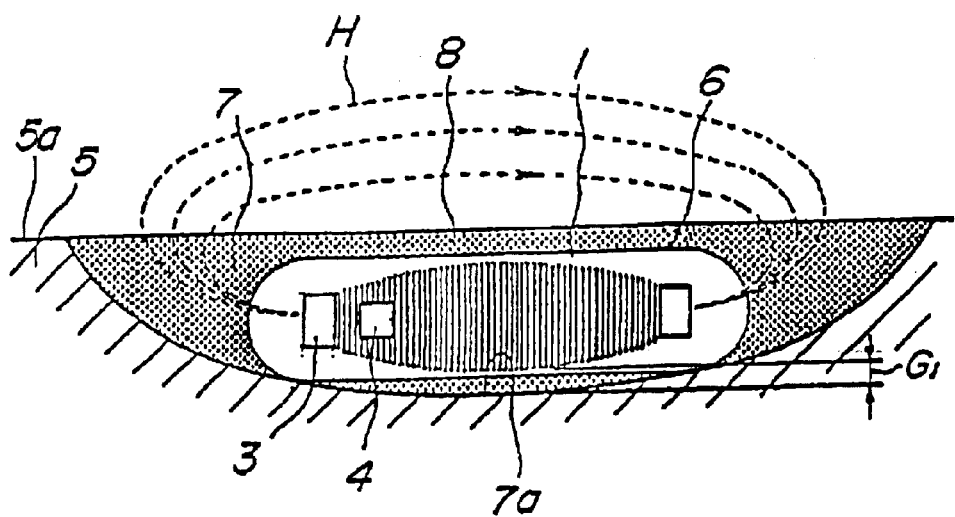

FIGS. 7A and 7B show another exemplary installation groove 7 formed in the conductive member 5 by a more simple process. In the installation previously shown in FIGS. 1A and 1B in which an approximately rectangular parallelepiped groove is formed, fabrication of the conductive member 5 requires a preliminary consideration on the shape thereof so as to afford such groove, or the installation groove 7 is possibly formed by drilling a plurality of holes aligned side by side.

Fabrication process for such installation groove 7 as shown in FIGS. 1A and 1B is, however, labor-consuming in particular for the case that the RFID tag 1 is to be installed to an already-finished conductive member 5. On the contrary, the installation groove 7 shown in FIGS. 7A and 7B having an arched bottom can be formed by cutting the conductive member 5 using a milling machine or lathe. The RFID tag 1 can directly be housed therein and installed so as to approximately contact with the bottom plane 7a of such installation groove 7, and the residual space in the installation groove 7 around the RFID tag 1 is filled with a non-conductive protective member such as resin 8 or adhesive so as to cover the outer periphery including the top surface of the tag.

This is advantageous in the simplicity of the process for forming the installation groove 7, in particular for the case that the RFID tag 1 is installed to the conductive member 5 of an already-finished product.

According to such constitution, only a shallow installation groove 7 will suffice so that properties and strength of the conductive member 5 can desirably be retained. This is particularly advantageous when the RFID tag 1 has to be installed to a thin conductive member 5.

Hence, according to the present invention, it is no more necessary, unlike the conventional installation, to ensure a space between the RFID tag 1 and the conductive member 5, or to interpose a spacer or the like made of a non-conductive member, so that the installation groove 7 to be made to the conductive member 5 can be shallower and the installation structure can be more simple.

Figure 8:
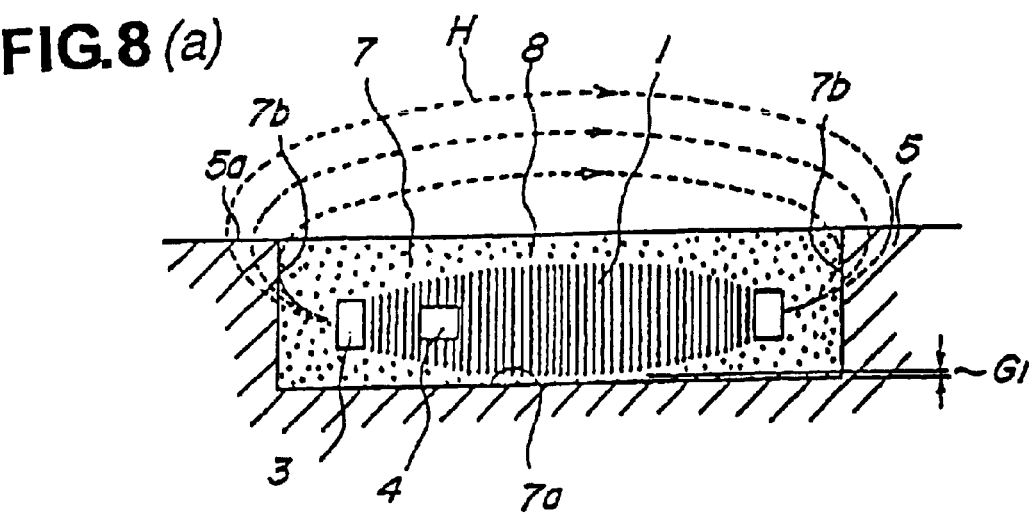
FIG. 8A is a schematic view showing still another exemplary installation structure of an RFID tag of the present invention, in which a top-opened installation groove is formed on the installation plane of a conductive member, and the surface of an RFID tag installed in the installation groove is covered with a protective member comprising a non-conductive resin.
FIG. 8B is a plan view showing the installation groove shown in FIG. 8A alternatively having a square profile.
FIG. 8C is a plan view showing the installation groove shown in FIG. 8A alternatively having a round profile.
Figure 8:
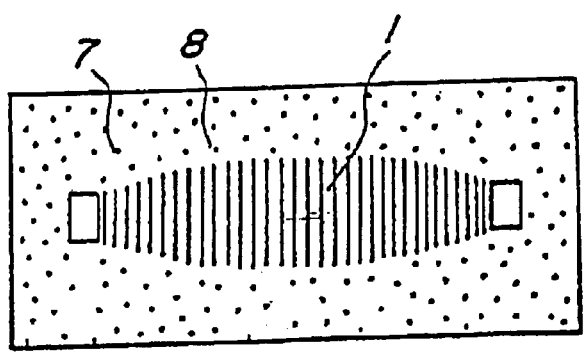
Figure 8:
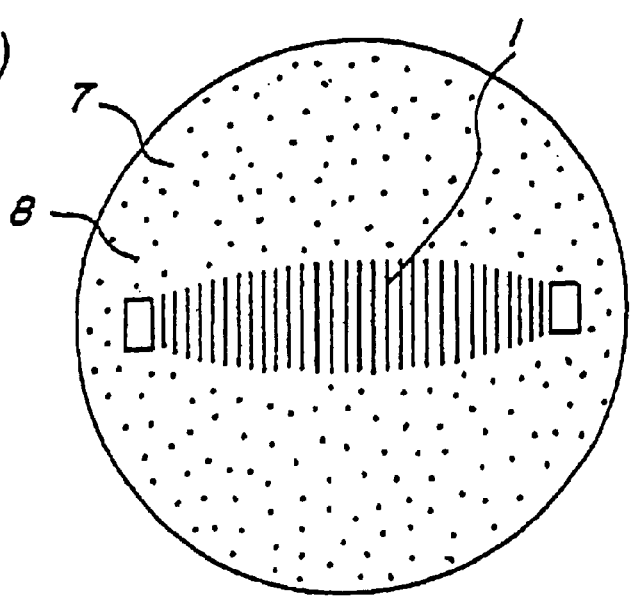

FIGS. 8A to 8C show an installation structure in which the antenna coil 2 and the semiconductor IC chip 4, both in a bare state without being encapsulated in a glass container, are embedded in the installation groove 7. Such omission of the glass container will not cause any problem provided that proper electric insulation is ensured by an electrical insulating film of the antenna coil 2 and a package of the semiconductor IC chip 4. This promotes further size reduction of a space for installation groove 7, to thereby retain properties and strength of the conductive member 5.

The top-opened installation groove 7 to be formed in the conductive member 5 may have a square section as shown in FIG. 8B, or may have a round section as shown in FIG. 8C. The installation groove 7 having a round section is advantageous since such groove 7 can readily be formed by, for example, drilling.

Shown in FIG. 15 is a measured result regarding the relation between the change of communication distance and the depth of the installation groove 7 with a round profile as illustrated in FIG. 8A.

The RFID tag used in this case is a reading only type (model type UNIQUE) made from Sokymat of Switzerland. Such RFID tag is a cylindrical antenna coil having a copper wire wound around a rod shape core and is enclosed in a glass container, in which the length of the core is 7.92 mm, the diameter of the coil is 1.42 mm, and the diameter of the glass container is 2.12 mm. This experiment was performed in a state where the glass container is cut to expose a tip end portion of the core.

The measuring method is performed by forming a hole with a diameter of 12.45 mmφ upon an iron block so as to form the installation groove 7, arranging the RFID tag horizontally inside the hole, and arranging a reading device above the hole.

Used as the reading device is a pocket reader (model type rdr 100) made from I.D. Systems Inc., in which the distance between the sending/receiving surface of the antenna and the hole is measured as the communication distance.

Adjustment of depth is performed by placing a thin iron plate cut into a round shape upon a bottom of the hole and changing the number of the plates.

As apparent in FIG. 15, when the depth is 8 mm, the communication distance is 0 mm (in other words, a state where the sending/receiving surface is contacting to the hole), and when the hole is formed with a depth no less than such depth, communication could not be performed. Further, the shallower the hole is formed, the longer the communication distance tends to become.

However, when the installation groove 7 is formed too shallow, the RFID tag would project outward from the groove and would be undesirable in terms of protection. Accordingly, the maximum depth of the hole should preferably be determined by the distance for obtaining a desired communication distance, and the minimum depth thereof should preferably be determined by the diameter of the RFID tag. The suggested range for the depth of the hole is approximately 1.1 times through 3 times of the diameter of the RFID tag.

Next, shown in FIG. 16 is a measured result regarding the relation between the communication distance and the diameter of a hole having a depth of 3 mm. The RFID tag, the reading device, the method, and the like used for measurement are the same as those in FIG. 15.

As apparent in FIG. 16, although the communication distance tends to expand when the diameter of the hole is extended, the change from such extension is relatively small. Accordingly, when the installation groove portion 7 is of a round profile, it would be sufficient for the diameter thereof to be slightly larger than the length of the RFID tag, and from a practical aspect, the diameter of the hole is desired to be approximately 1.1 times through 1.5 times of the length of the RFID tag.

Figure 9:
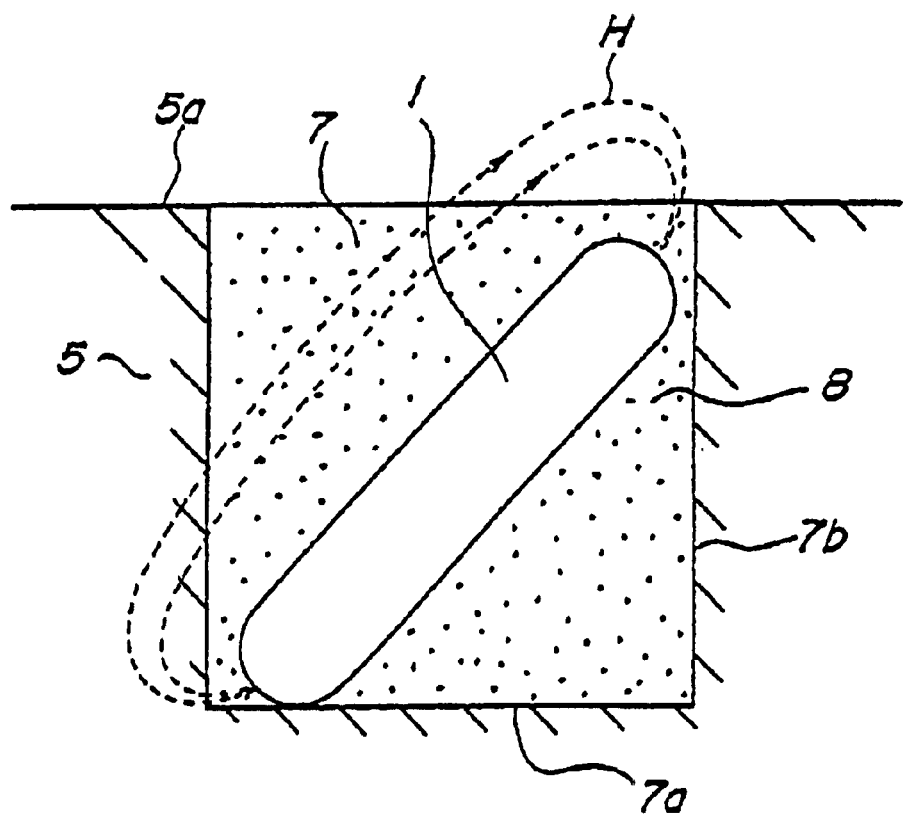
FIG. 9 is a sectional view showing an RFID tag installed in the installation groove so as to direct the axial direction thereof oblique to the bottom plane of the installation groove.

FIG. 9 shows an exemplary installation in which the RFID tag 1 is installed so as to align the axial direction thereof oblique to the bottom plane 7a of the installation groove 7. According to such constitution, the projected area for the installation on the conductive member 5 can further be reduced as compared with the case for the above embodiments. In addition, the magnetic flux can leak through a space resulted from such oblique installation toward the outside of the installation groove 7, which can mediate the communication with an external read/write terminal.

Figure 10:
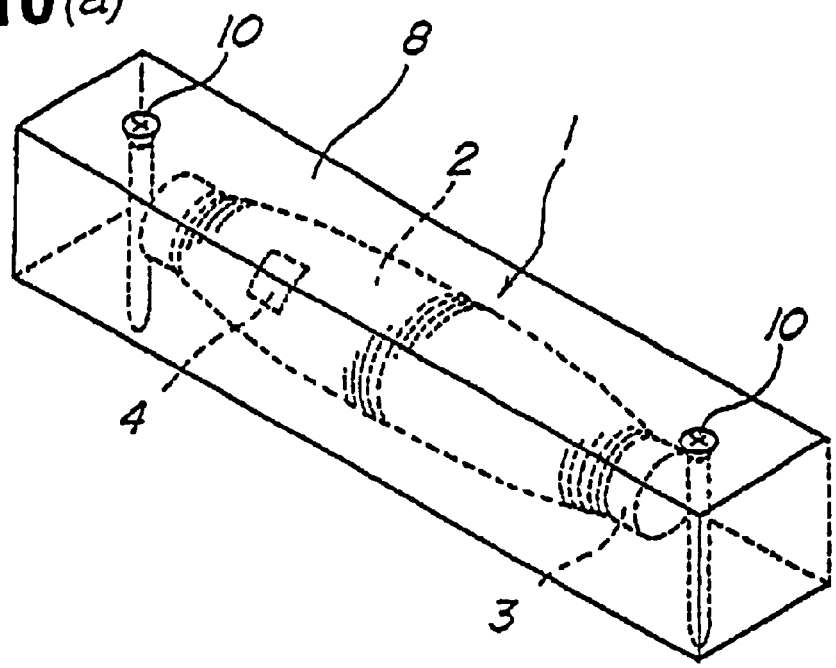
FIGS. 10A and 10B are a perspective view and a sectional view, respectively, showing an installation structure in which an RFID tag covered with a protective member comprising a non-conductive resin is installed on the installation plane of the conductive member.
Figure 10:
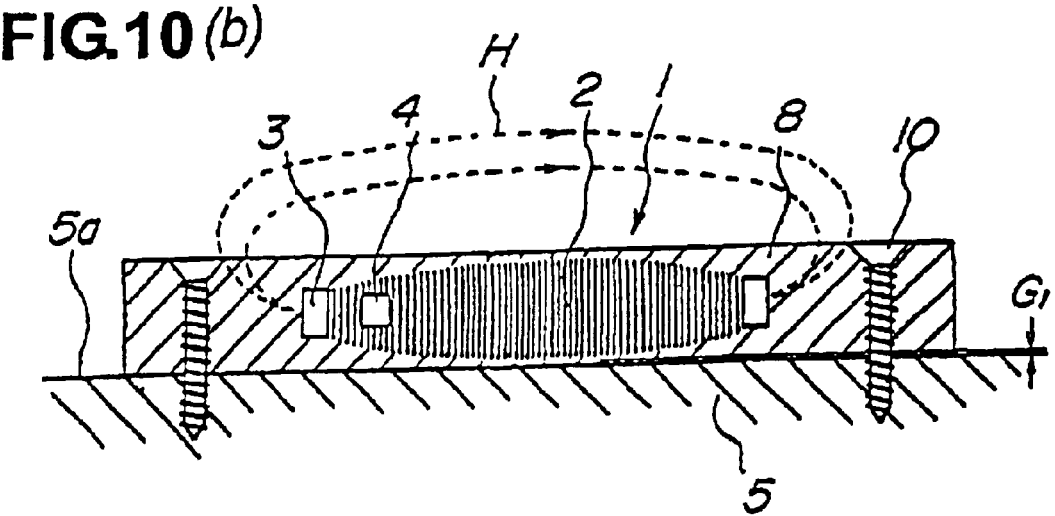
Figure 11:
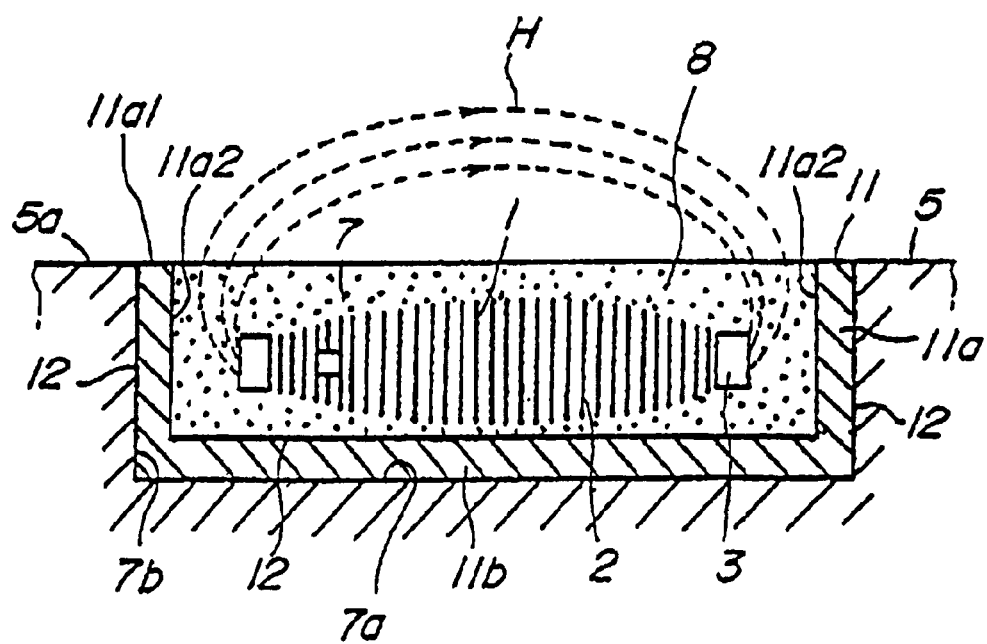
FIG. 11 is a sectional view showing an installation structure of an RFID tag protected on the lateral and installation planes thereof with a protective member comprising a conductive member.

FIGS. 10A and 10B show an exemplary installation, in which the outer periphery including the top surface of the RFID tag 1, which comprises the antenna coil 2, core member 3 and semiconductor IC chip 4, is molded with a resin 8 as a non-conductive protective member, and such tag 1 is fixed as contacted on the surface 5a of the conductive member 5 using machine screws 10 so as to align the axial direction thereof in parallel to such surface 5a as an installation plane.

It is now also allowable to use an adhesive or so, in place of the machine screws 10, for the fixation, and it is even allowable to fix the antenna coil 2 and the semiconductor IC chip 4 in a bare state on the surface 5a of the conductive member 5.

Also in this embodiment, the distance $G_1$ between the conductive outer surface of the antenna coil 2 opposing to the conductive member 5, and the surface 5a of such conductive member 5 as an installation plane is set at not smaller than 10 μm, which is equivalent to the thickness of an insulating film of the wound wire of the antenna coil 2, and at 5 mm or below.

According to such constitution, it is no more necessary to form the installation groove 7 to the conductive member 5 unlike the foregoing embodiments, which is advantageous in retaining properties and strength of the conductive member 5. Enhancing the strength of a case covering the antenna coil 2 and the semiconductor IC chip 4 will ensure safe retainment of the RFID tag 1.

Figure 12:
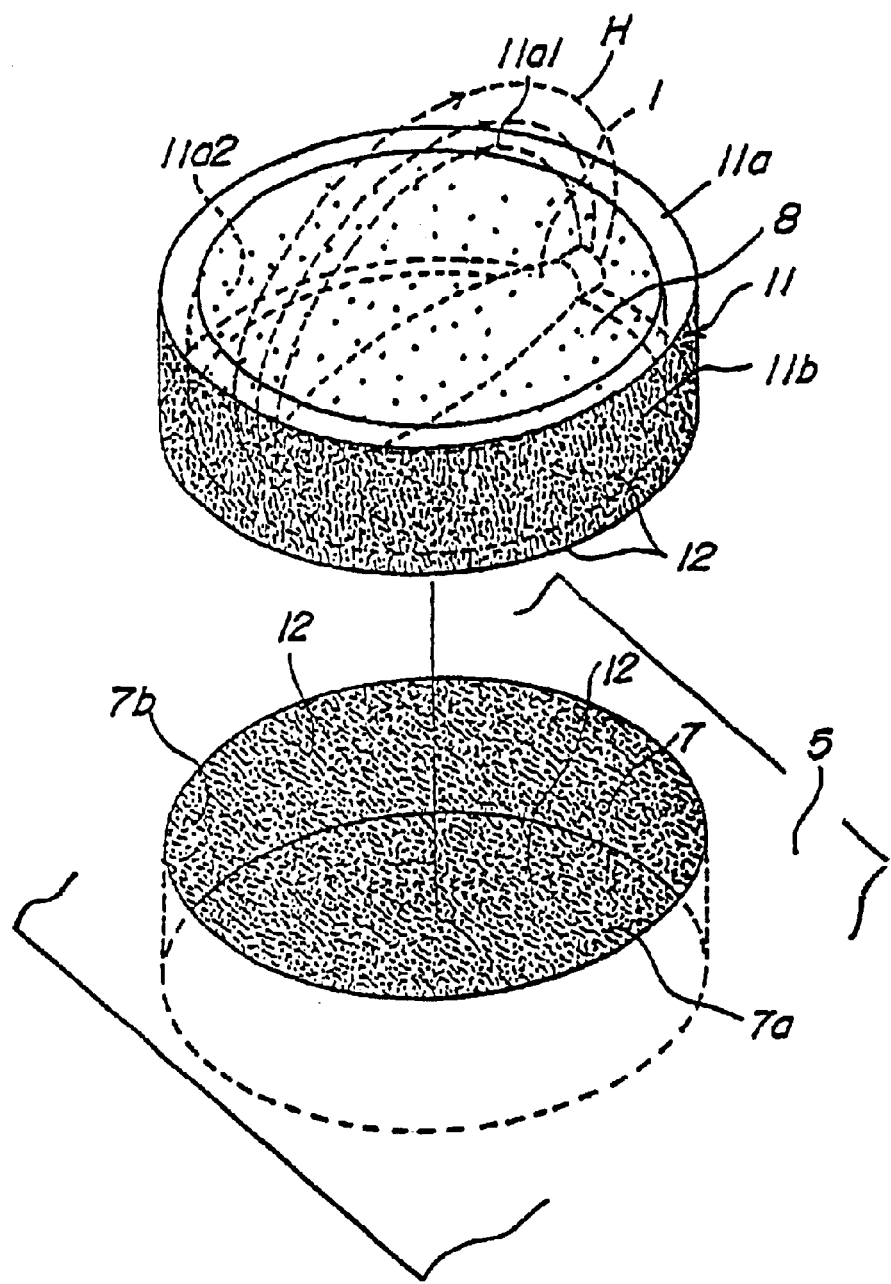
FIG. 12 is an exploded perspective view showing the installation groove and the protective member shown in FIG. 11 alternatively having a round profile.

FIGS. 11 to 14 show exemplary installations in which the lateral plane and a plane opposing to the installation plane of the RFID tag 1 are protected with a protective member 11. The protective member 11 shown in FIG. 12 is composed as a metal protective member comprising a cylindrical side plate 11a and a disk-formed bottom plate 11b, both having a size conformable to the RFID tag 1, and the top-opened installation groove 7 formed in the conductive member 5 is composed to have a round section in a size conformable to such protective member 11.

Figure 13:
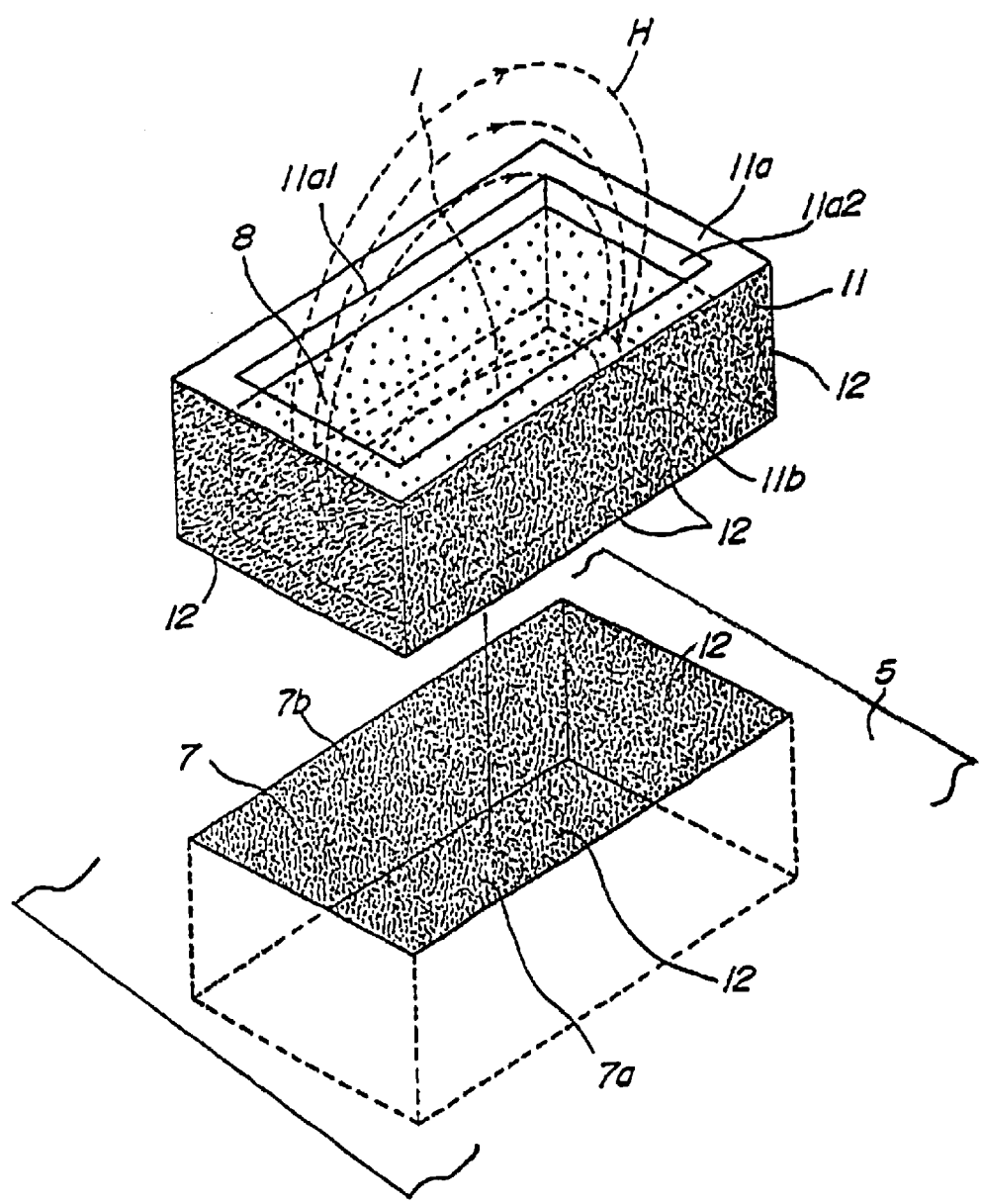
FIG. 13 is an exploded perspective view showing the installation groove and the protective member shown in FIG. 11 alternatively having a square profile.

The protective member 11 shown in FIG. 13 comprises a square side plate 11a and a square bottom plate 11b, both having a size conformable to the RFID tag 1, and the top-opened installation groove 7 formed in the conductive member 5 is composed to have a square section in a size conformable to such protective member 11. The protective member 11 can be composed of various metals such as iron, brass and stainless steel.

The RFID tag 1 is housed in the top-opened housing portion of the protective member 11, and fixed by covering the outer periphery including the top surface thereof with a protective member which may be composed of a non-conductive material such as resin 8 or adhesive.

Also in this embodiment, the distance $G_1$ between the conductive outer surface of the antenna coil 2 opposing to the conductive member 5, and the bottom plate 11b of such protective member 11 as an installation plane is set at not smaller than 10 μm, which is equivalent to the thickness of an insulating film of the wound wire of the antenna coil 2, and at 5 mm or below.

An adhesive 12 is applied on the lateral plane and the bottom plane of the protective material 11, or on the inner plane of the installation groove 7 of the conductive member 5; the protective member 11 is inserted in the installation groove 7 so as to direct the opened top of such housing portion to the opened top of such installation groove 7 and is then fixed by the adhesive 12 to thereby complete the installation. The RFID tag 1 in this case is installed so as to align the axial direction thereof in parallel to or oblique to the bottom plane 7a of the installation groove 7 as shown in FIG. 9.

It is now allowable to preliminarily apply the adhesive 12 on at least either one of the protective member 11 or the installation groove 7 of the conductive material 5.

While this embodiment illustratively showed an exemplary installation in which all of the top plane $11a_1$, of the side plate 11a of the protective member 11, the top surface of the resin 8 and the surface 5a of the conductive material 5 are approximately aligned in the same plane, the top surface $11a_1$ of the side plate 11a of the protective member 11 may be fixed so as to be projected upward from the surface 5a of the conductive member 5.

A predetermined gap is formed between the end portion of the core member 3 inserted in the antenna coil 2 of the RFID tag 1 and the inner plane $11a_2$ of the side plate 11a of the protective member 11, which facilitates formation of the magnetic flux penetrating the antenna coil 2 and accordingly the formation of magnetic field H.

The magnetic field H can propagate from the opened top portion of the protective member 11, which allows send/receive operation of AC magnetic field, which is a medium for power transmission and information communication, between the RFID tag 1 and an external read/write terminal not shown.

According to such constitution, the RFID tag 1 is housed within the protective member 11, and such protective member 11 covering the lateral plane and a plane opposing to the installation plane of the RFID tag 1 is fixed within the installation groove 7 of the conductive member 5, which ensures safe retainment of the RFID tag 1.

Since the RFID tag 1 is installed in the installation groove 7 of the conductive member 5 while being housed within the top-opened protective member 11, the magnetic field H, which is a medium for power transmission and information communication, can be sent to or received from an external read/write terminal with a high sensitivity mediated by the magnetic flux in a space over the installation plane of the conductive member 5.

Composing the protective member 11 in a container form, having the side plate 11a and the bottom plate 11b, allows protection of the lateral side of the RFID tag 1 by such side plate 11a, and protection and reinforcement of a plane of the RFID tag 1 opposing to the installation plane with such bottom plate 11b. Preliminarily filling the resin 8 into such container composed of the side plate 11a and the bottom plate 11b can facilitate the fixing of the RFID tag 1 to the protective member 11.

Providing a shock absorbing material within the housing portion of the protective member 11 for housing the RFID tag 1 can effectively absorb impact by external force, to thereby ensure safe retainment of the RFID tag 1. Providing a heat insulating material, on the other hand, can stabilize the temperature of the RFID tag 1, to thereby prevent the resonance frequency from being shifted, and stabilize the send/receive operation of electric power and signals.

Previously housing and fixing the RFID tag 1 in the housing portion of the protective member 11 facilitates the attachment of such protective member 11 and positioning of the RFID tag with respect to the conductive member 5.

Figure 14:
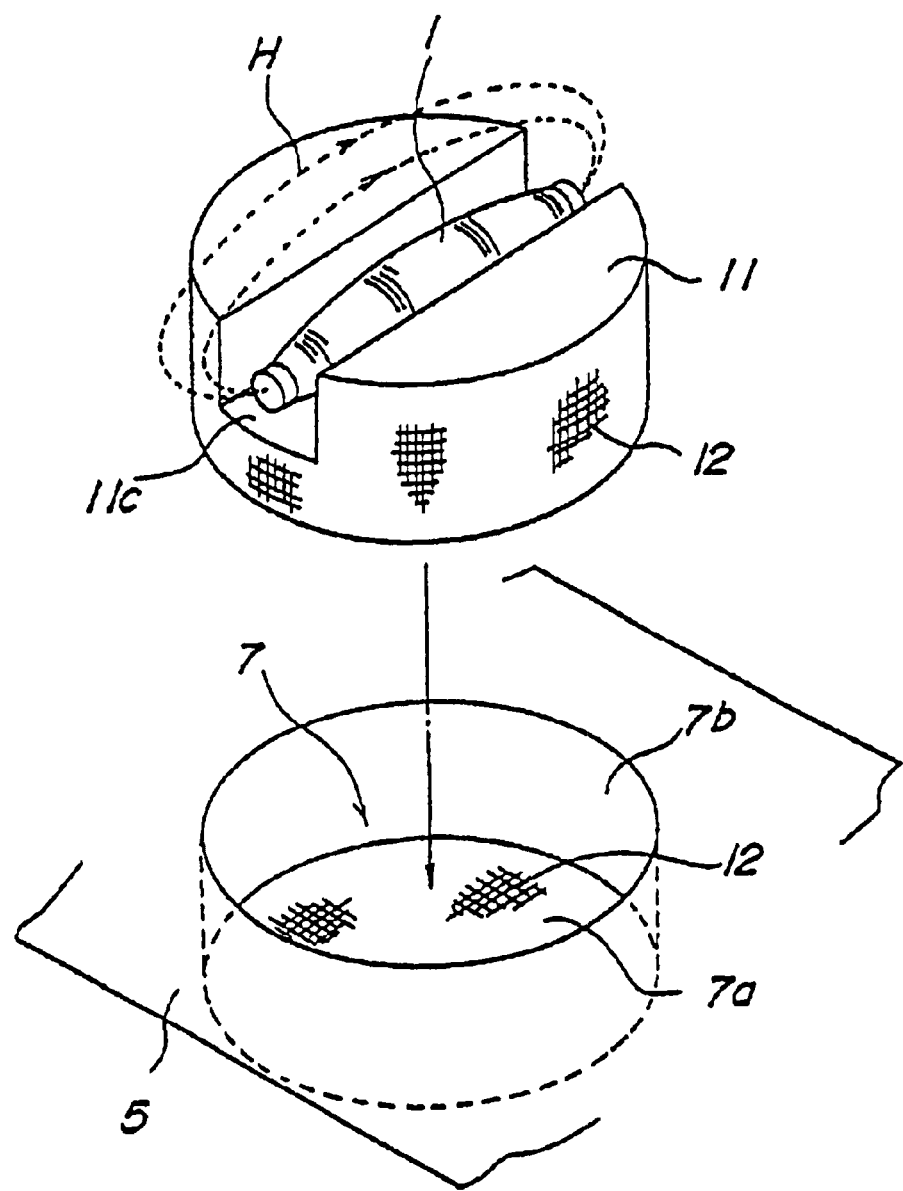
FIG. 14 is an exploded perspective view showing the RFID tag protected on the lateral plane and/or plane opposing to the installation plane thereof with a protective member which is made of a conductive material and has at the center thereof a straight installation groove.

FIG. 14 shows an exemplary installation in which the cylindrical protective member 11 made of a conductive material has on the surface side thereof a straight groove 11c as a housing portion, and the RFID tag 1 is housed in such groove 11c so as to align the axial direction thereof in parallel to the installation plane of such groove 11c and so as to keep a distance of 10 µm to 5 mm away from such installation plane, to thereby protect the lateral plane and a plane opposing to the installation plane of the RFID tag 1 with such protective member 11.

An adhesive 12 is applied on the lateral plane and the bottom plane of the protective material 11, or on the inner plane of the installation groove 7 of the conductive member 5; the protective member 11 is inserted in the installation groove 7 so as to direct the opened top of such housing portion upward, and is then fixed by the adhesive 12 to thereby complete the installation.

While being not illustrated in the drawings, the RFID tag 1 may be installed in the installation groove 7 having a conformable size but having a variety of shapes, or the protective member 11 having a size conformable to the RFID tag 1 but having a variety of shapes may be inserted and fixed in the installation groove 7 having a conformable shape.

It is also allowable to pack a non-conductive shock absorbing material or a heat insulating material such as sponge or glass wool in the residual space within the installation groove 7 or in the protective member 11 around the RFID tag 1 housed therein, and to further cover the surface thereof with the resin 8 or the like.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A structure for mounting an RFID tag onto a conductive member, comprising:
    an RFID tag, that includes a cylindrical antenna coil and a control section, that communicates using amplitude shift keying (ASK);
    a container made of a non-conductive material that encloses the RFID tag, such that a longitudinal direction of the cylindrical antenna coil is substantially aligned with a longitudinal direction of the container, and insulates the RFID tag from the conductive member;
    a groove formed within a top surface of the conductive member, wherein interior dimensions of the groove substantially correspond to external dimensions of the container; and
    a non-conductive protective member made with non-conductive material that covers the top surface of the container;
    wherein the longitudinal direction of the cylindrical antenna coil is aligned substantially parallel with the top surface of the conductive member.

2. The installation structure for an RFID tag according to claim 1, wherein a distance between a surface of the groove in the conductive member and the RFID tag enclosed within the container is from about 10µm to about 5 mm.

3. The installation structure for an RFID tag according to claim 1, further comprising:
    a conductive protective member that is a layer of conductive material positioned between the container and a surface of the groove.

4. The installation structure for an RFID tag according to claim 3, wherein the conductive protective member is an open housing of conductive material that receives the container and inserts within the groove.

5. The installation structure for an RFID tag according to claim 1, wherein a frequency used for ASK communication is from about 50 kHz to about 500 kHz.

6. A method for installing within a conductive member an RFID tag, that includes a cylindrical antenna coil and a control section, that is enclosed in a container made of a non-conductive material such that a longitudinal direction of the cylindrical antenna coil is substantially aligned with a longitudinal direction of the container and such that the RFID tag is insulated from the conductive member;
    forming a top-opened installation groove in a top surface of the conductive member;
    installing the container in an open housing of a conductive protective member made of a conductive material;

disposing the conductive protective member in the top-opened installation groove formed in the top surface of the conductive member, an opening of the conductive protective member being accessible through the top surface of the conducting member, whereby the longitudinal direction of the cylindrical antenna coil enclosed within the non-conducting container is aligned substantially in parallel with the top surface of the conductive member.

7. A communication method using an RFID tag installed within a conductive member, wherein the RFID tag communicates with an amplitude shift keying (ASK) system via a cylindrical antenna coil that includes a control section, and wherein the RFID tag is enclosed within a container made of non-conducting material such that a longitudinal direction of the cylindrical antenna coil is substantially aligned with a longitudinal direction of the container and the RFID is insulated from the conductive member, the method comprising:

forming a top-opened installation groove in a top surface of the conductive member;

installing the container within the installation groove, such that the longitudinal direction of the cylindrical antenna coil enclosed within the non-conducting container is substantially aligned in parallel with the top surface of the conductive member; and communicating using RFID via magnetic flux mediated by the RFID above the top surface of the conductive member.

* * * * *